US010407326B2

(12) United States Patent
Watanabe et al.

(10) Patent No.: US 10,407,326 B2
(45) Date of Patent: Sep. 10, 2019

(54) WASTE LIQUID TREATMENT DEVICE AND WASTE LIQUID TREATMENT METHOD

(71) Applicant: TANAKA KIKINZOKU KOGYO K.K., Chiyoda-ku, Tokyo (JP)

(72) Inventors: Jun Watanabe, Hiratsuka (JP); Matsunori Sawada, Hiratsuka (JP); Hiroyasu Sato, Hiratsuka (JP); Tetsuya Ueda, Hiratsuka (JP); Takanori Kimura, Hiratsuka (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 133 days.

(21) Appl. No.: 15/534,728

(22) PCT Filed: Dec. 10, 2015

(86) PCT No.: PCT/JP2015/084725
§ 371 (c)(1),
(2) Date: Jun. 9, 2017

(87) PCT Pub. No.: WO2016/093330
PCT Pub. Date: Jun. 16, 2016

(65) Prior Publication Data
US 2017/0341961 A1    Nov. 30, 2017

(30) Foreign Application Priority Data
Dec. 11, 2014 (JP) .................. 2014-251316

(51) Int. Cl.
*C02F 1/58* (2006.01)
*C02F 1/70* (2006.01)
(Continued)

(52) U.S. Cl.
CPC ................ *C02F 1/705* (2013.01); *C02F 1/58* (2013.01); *C02F 2101/10* (2013.01);
(Continued)

(58) Field of Classification Search
CPC ...... C02F 1/58; C02F 1/705; C02F 2301/028; C02F 2301/024; C02F 2103/346;
(Continued)

(56) References Cited

U.S. PATENT DOCUMENTS

| | | | | |
|---|---|---|---|---|
| 6,004,469 A | * | 12/1999 | Sanders | ................ C02F 1/705 210/763 |
| 6,136,186 A | * | 10/2000 | Gonzalez-Martin | ........................ B01D 53/864 210/198.1 |
| 6,238,631 B1 | * | 5/2001 | Ogata | ................ B01D 53/007 422/186.3 |

FOREIGN PATENT DOCUMENTS

| JP | 61-186208 A | 8/1986 |
|---|---|---|
| JP | 63-122698 U1 | 8/1988 |

(Continued)

OTHER PUBLICATIONS

PCT, International Search Report for PCT/JP2015/084725, dated Feb. 9, 2016.
(Continued)

*Primary Examiner* — Lucas A Stelling
(74) *Attorney, Agent, or Firm* — Orrick, Herrington & Sutcliffe LLP; Joseph A. Calvaruso

(57) ABSTRACT

A waste liquid treatment device (20) treats water to be treated that contains at least hydrogen peroxide, by decomposing the hydrogen peroxide. The waste liquid treatment device (20) is equipped with a housing (21), an introduction port (22) that is provided to the housing (21) and that introduces the water to be treated into the housing (21), a discharge port (23) that is provided to the housing (21) and that discharges treated water to be obtained by treating the water to be treated, and one or more channel-defining members (24) that are disposed within the housing (21) and that have a surface that a catalyst is disposed on, wherein the
(Continued)

one or more channel-defining members (24) define, between the introduction port (22) and the discharge port (23), a channel (P) for the water to be treated, the channel (P) having a turning in at least one position.

8 Claims, 5 Drawing Sheets

(51) Int. Cl.
  *C02F 101/10* (2006.01)
  *C02F 103/34* (2006.01)
(52) U.S. Cl.
  CPC .. *C02F 2103/346* (2013.01); *C02F 2301/024* (2013.01); *C02F 2301/028* (2013.01)
(58) Field of Classification Search
  CPC ............ C02F 2101/10; B01F 2005/008; B01F 2005/0094; B01F 2005/0097; B01J 19/0053; B01J 19/006; B01J 19/248; B01J 19/249
  See application file for complete search history.

(56) References Cited

FOREIGN PATENT DOCUMENTS

| | | |
|---|---|---|
| JP | 4-022494 A | 1/1992 |
| JP | 5-345188 A | 12/1993 |
| JP | 07-039993 U | 7/1995 |
| JP | 3030389 U | 10/1996 |
| JP | 10-211487 A | 8/1998 |
| JP | 2000-107773 A | 4/2000 |
| JP | 2000-213341 A | 8/2000 |
| JP | 2003-170175 A | 6/2003 |
| JP | 2006-035040 A | 2/2006 |
| JP | 2012-045472 A | 3/2012 |

OTHER PUBLICATIONS

JP, Office Action for Japanese application No. 2014-251316, dated Mar. 5, 2018.

\* cited by examiner

[Fig.1]
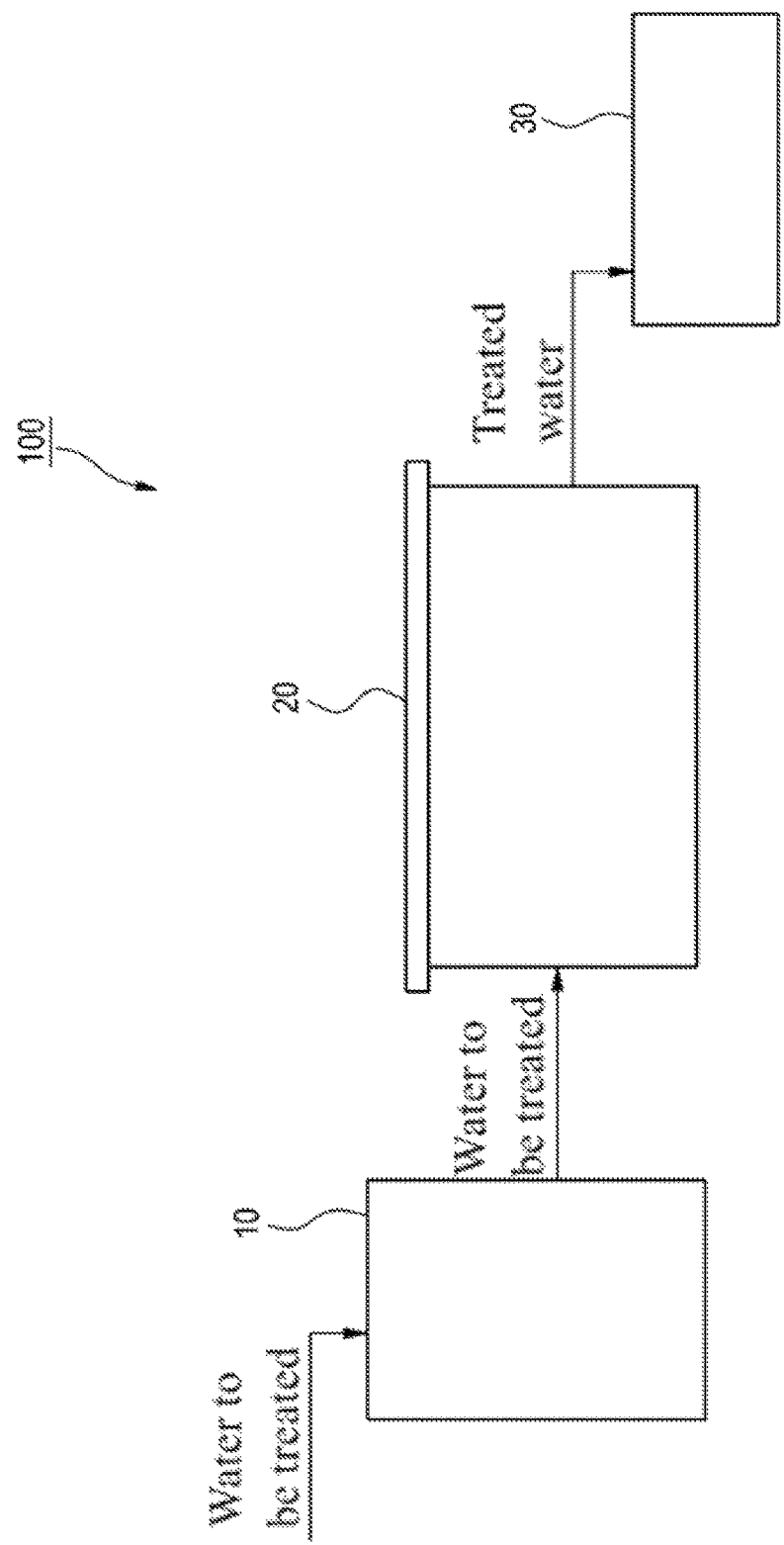

[Fig.2]
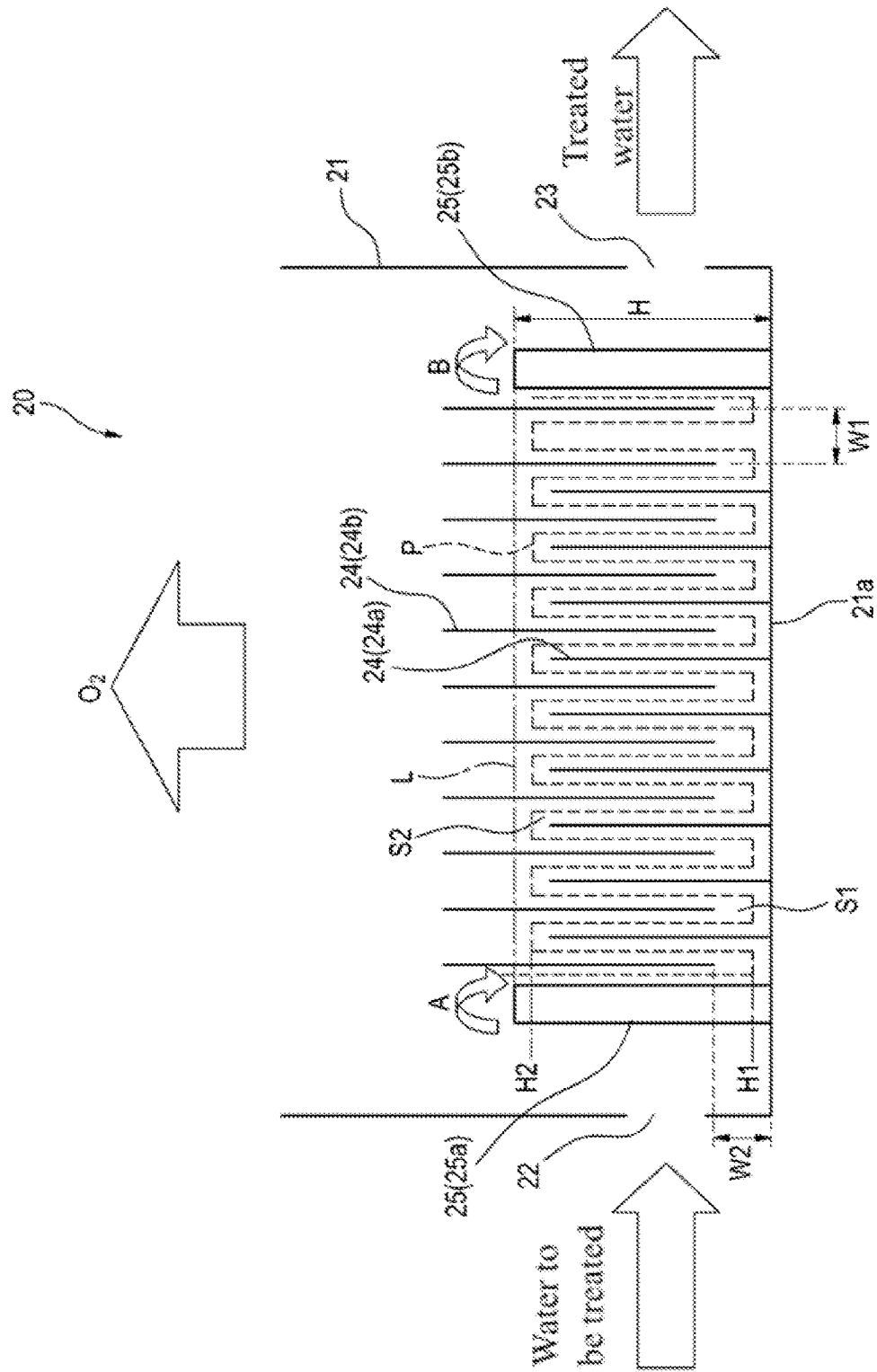

[Fig.3]
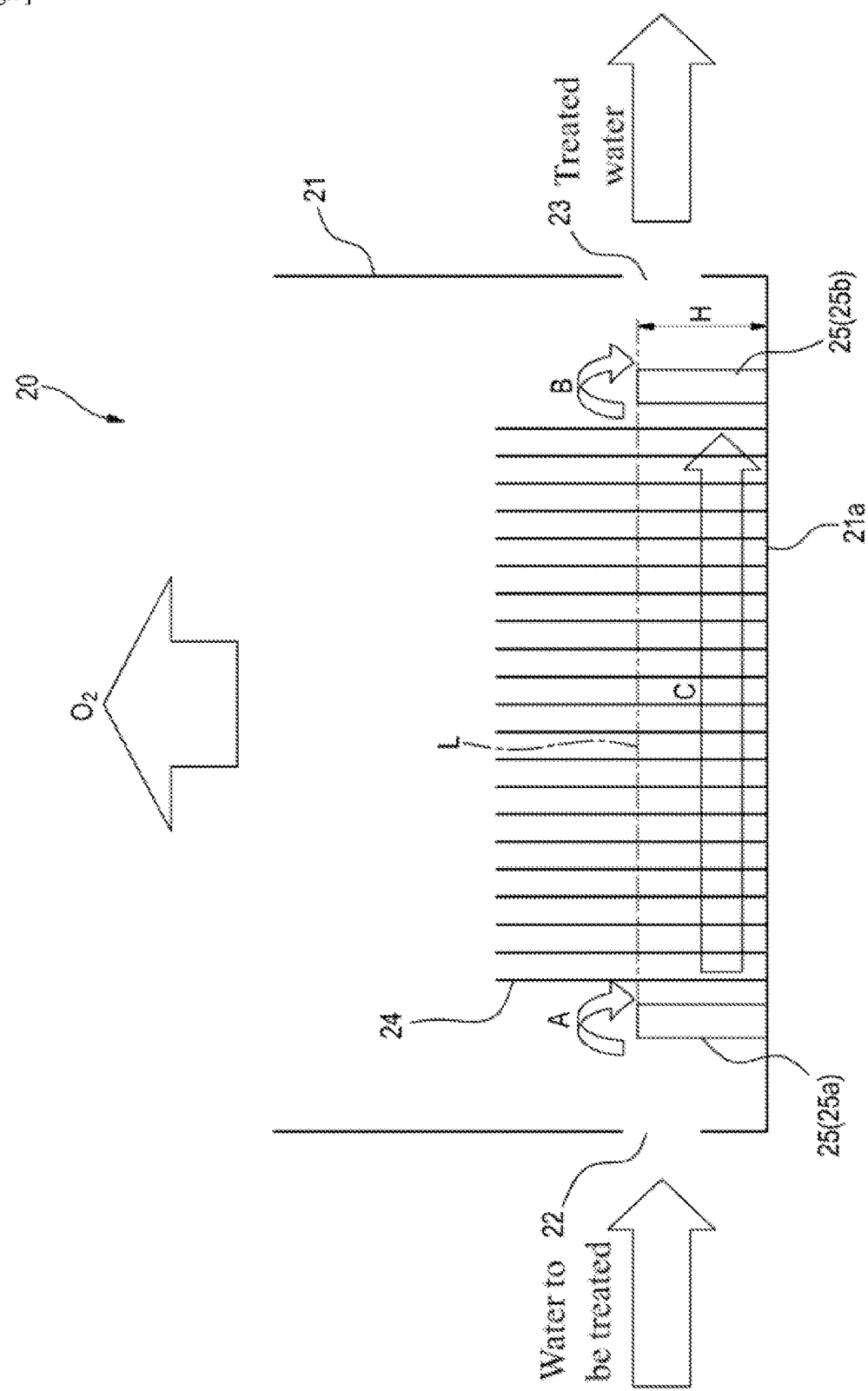

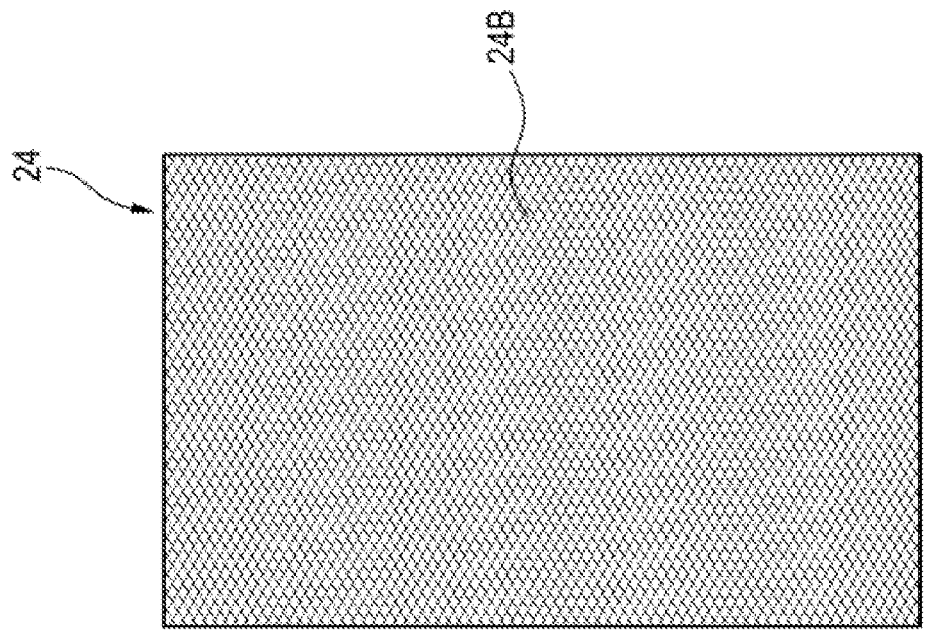
[Fig. 4B]
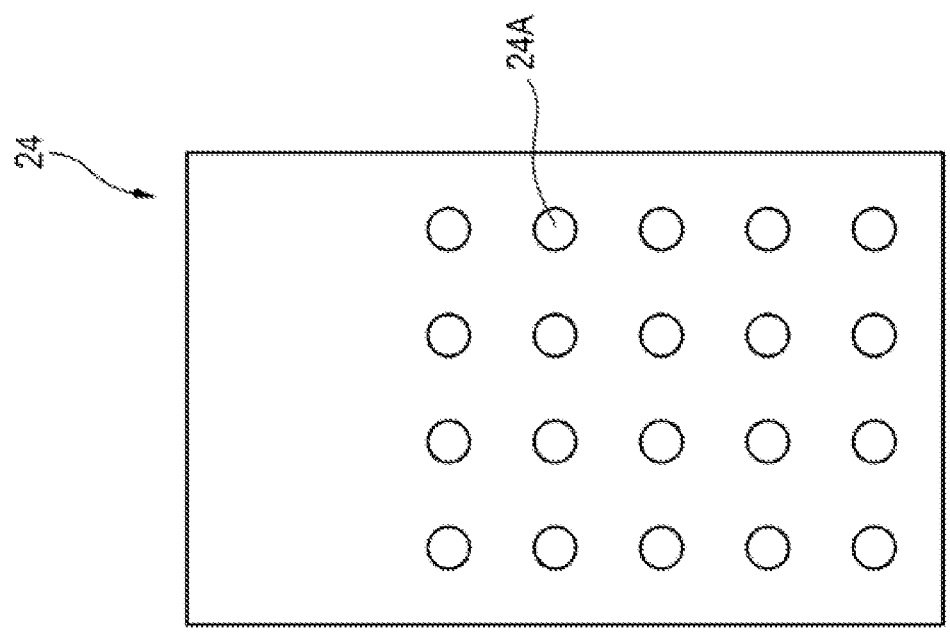
[Fig. 4A]

[Fig.5A]
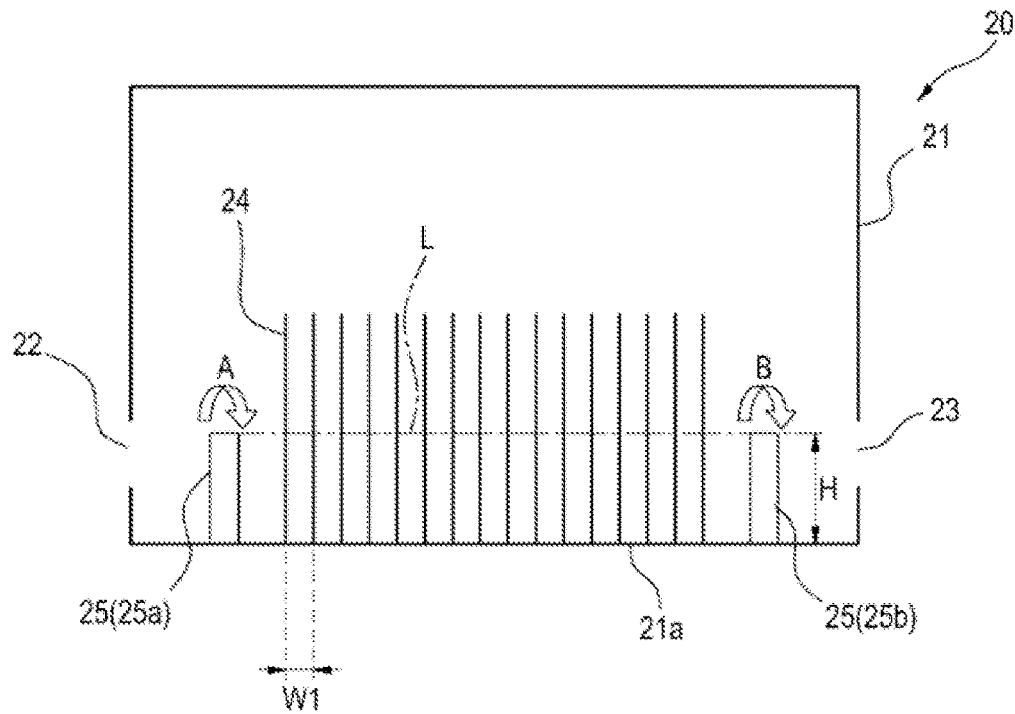
[Fig.5B]
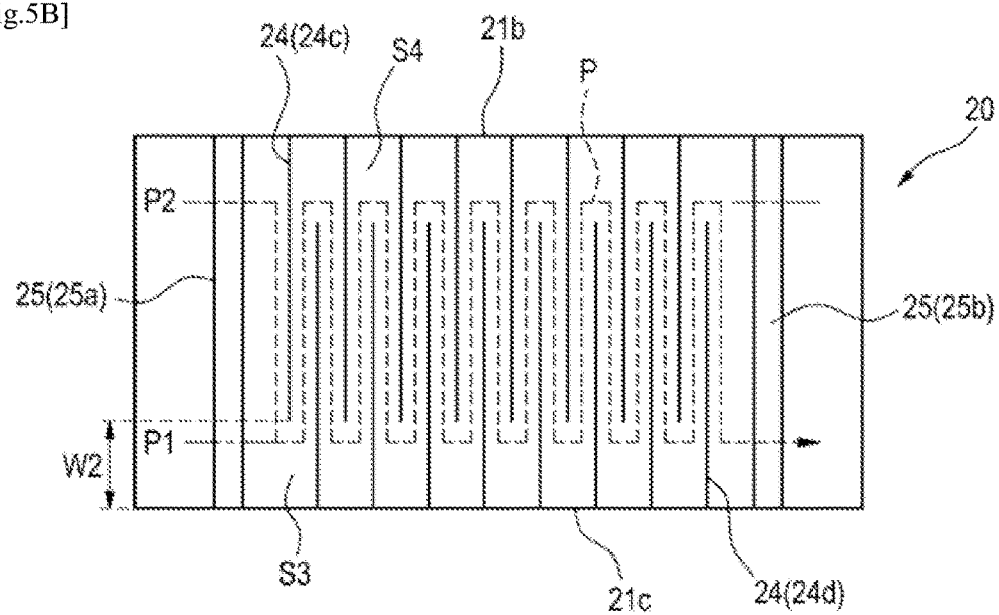

WASTE LIQUID TREATMENT DEVICE AND WASTE LIQUID TREATMENT METHOD

TECHNICAL FIELD

The present invention relates to a waste liquid treatment device and a waste liquid treatment method.

BACKGROUND ART

In steps for semiconductor production, a treating liquid containing an acid (e.g., sulfuric acid) and hydrogen peroxide is used in silicon wafer pretreatment, etc. As this treating liquid is repeatedly used, accumulation of impurities such as silica and decomposition of the hydrogen peroxide proceed to lower the acid concentration, resulting in a decrease in treatment function. It is hence necessary to renew the treating liquid intermittently. Because of this, a waste liquid having a high acid concentration and containing residual hydrogen peroxide is discharged in a large quantity. The amount of this waste liquid is affected by the regulations of the industrial waste management law.

Consequently, it becomes important to develop a technique by which the hydrogen peroxide remaining in the waste liquid is safely decomposed to a recycling level and which enables the concentrated acid (sulfuric acid) in the waste liquid to be recovered and be recycled or sold. In cases when the hydrogen peroxide is decomposed and the remaining acid is thereafter treated by neutralization, then there are cases where the separation by floatation of the neutralization-yielded precipitate which has risen up is difficult due to the remaining hydrogen peroxide.

As methods for decomposing hydrogen peroxide, the following techniques are, for example, known.

(1) A method in which a waste liquid containing sulfuric acid and hydrogen peroxide is neutralized using an alkali agent, such as sodium hydroxide, calcium hydroxide, or ammonia, and the hydrogen peroxide is then removed.

(2) A method in which no alkali agent is used, wherein the hydrogen peroxide is decomposed with a hydrogen peroxide decomposition catalyst while supplying hydrogen to the catalyst (see patent document 1).

(3) A method in which the waste liquid having an elevated temperature is passed through a carbonaceous substance to decompose the hydrogen peroxide (see patent document 2).

(4) A method in which use is made of an activated-carbon treatment device where a liquid to be treated that contains hydrogen peroxide is caused to flow upward through an activated-carbon tower packed with granular activated carbon, from the bottom side toward the top side, thereby bringing the liquid to be treated into contact with the granular activated carbon to decompose the hydrogen peroxide, and in which the activated-carbon layer constituted of the granular activated carbon packed into the activated-carbon tower has a top-side cross-sectional area that is larger than on the bottom side (see patent document 3).

PRIOR-ART DOCUMENTS

Patent Documents

Patent Document 1: JP-A-S61-186208
Patent Document 2: JP-A-H5-345188
Patent Document 3: JP-A-H10-211487

SUMMARY OF THE INVENTION

Problems that the Invention is to Solve

Method (1) has a problem in that the sulfuric acid salt corresponding to the alkali agent used, e.g., sodium sulfate, calcium sulfate, or ammonium sulfate, is yielded in a large amount, and it is necessary to handle these salts as an industrial waste. In addition, since the high-concentration sulfuric acid is neutralized with an alkali, heat of neutralization generates in a large quantity and this not only necessitates heat removal or the like but also requires a measure against the possible generation of sulfuric acid mist due to the temperature increase.

Method (2) necessitates use of hydrogen gas that is highly flammable, and has a problem concerning a decrease in catalytic activity.

Method (3) involves a risk due to the heating of the highly acidic solution containing hydrogen peroxide, and has a problem in that energy for the heating is necessary.

In method (4), the hydrogen peroxide concentration of the water to be treated is supposed to be several hundreds of milligrams per liter. Since the hydrogen peroxide concentration of the water to be treated is supposed to be low at first, the capacity of the method is insufficient for practical use.

Besides the techniques disclosed in the patent documents shown above, a large number of conventional techniques are known in which a chemical, e.g., sulfurous acid, light irradiation, steam, high pressure, or the like is applied when decomposing hydrogen peroxide. However, use of such means results in a considerable increase in the cost of hydrogen peroxide decomposition.

Consequently, the present invention provides a waste liquid treatment device and a waste liquid treatment method that are capable of easily and efficiently treating a waste liquid (water to be treated) that contains hydrogen peroxide, while overcoming the problems described above.

Means for Solving the Problems

The present inventors diligently made investigations and, as a result, have accomplished the present invention.

The waste liquid treatment device of the present invention is a waste liquid treatment device for treating water to be treated that contains at least hydrogen peroxide by decomposing the hydrogen peroxide, comprising:

a housing, an introduction port that is provided to the housing and that introduces the water to be treated into the housing, a discharge port that is provided to the housing and that discharges treated water to be obtained by treating the water to be treated, and one or more channel-defining members that are disposed within the housing and that have a surface that a catalyst capable of decomposing hydrogen peroxide is disposed on, wherein the one or more channel-defining members define, between the introduction port and the discharge port, a channel for the water to be treated, the channel having a turning in at least one position.

In one embodiment of the waste liquid treatment device of the invention, the channel-defining members comprise one or more first channel-defining members attached to both a bottom of the housing and a first lateral side thereof and one or more second channel-defining members attached to both the bottom of the housing and a second lateral side thereof, the second lateral side facing the first lateral side, and the one or more first channel-defining members and the one or more second channel-defining members are alternately arranged between the introduction port and the discharge port to define the channel so that the water to be treated flows while turning back at at least two horizontally different positions.

In another embodiment of the waste liquid treatment device of the invention, the channel-defining members comprise one or more first channel-defining members attached to a bottom of the housing and one or more second channel-defining members disposed apart from the bottom of the housing, and the one or more first channel-defining members and the one or more second channel-defining members are alternately arranged between the introduction port and the discharge port to define the channel so that the water to be treated flows while turning back at at least two vertically different heights.

In still another embodiment of the waste liquid treatment device of the invention, the one or more channel-defining members have one or more holes formed therein that the water to be treated can pass through, and the water to be treated undergoes turbulent flows when passing through the one or more channel-defining members, thereby defining the channel that has a turning in a pseudo manner in at least one position.

In a further embodiment of the waste liquid treatment device of the invention, the channel-defining member is constituted of at least any of one plate, one punching metal, and one expanded metal.

The waste liquid treatment method of the invention is a waste liquid treatment method for treating water to be treated by decomposing the hydrogen peroxide contained in the water to be treated, comprising:

introducing the water to be treated into a housing that includes one or more channel-defining members that have a surface that a catalyst capable of decomposing hydrogen peroxide is disposed on, and causing the water to be treated to flow through a channel, the channel being defined by the channel-defining members and having a turning in at least one position, thereby treating the water to be treated.

Effects of the Invention

According to the present invention, a waste liquid treatment device and a waste liquid treatment method are provided with which it is possible to easily and efficiently treat a waste liquid (water to be treated) that contains hydrogen peroxide.

BRIEF DESCRIPTION OF THE DRAWINGS

FIG. 1 is a view that diagrammatically shows the configuration of a waste liquid treatment system including a waste liquid treatment device according to one aspect of the invention.

FIG. 2 is a view that shows the internal configuration of one embodiment of the waste liquid treatment device.

FIG. 3 is a view that shows the internal configuration of another embodiment of the waste liquid treatment device.

FIG. 4A and FIG. 4B shows examples of the channel-defining members to be disposed in the waste liquid treatment device: FIG. 4A is an example of a channel-defining member constituted of a punching metal; and FIG. 4B is an example of a channel-defining member constituted of an expanded metal.

FIG. 5A and FIG. 5B are view that shows the internal configuration of still another embodiment of the waste liquid treatment device: FIG. 5A is a side view that illustrates the internal configuration of the waste liquid treatment device; and FIG. 5B is a plan view that illustrates the internal configuration of the waste liquid treatment device.

MODES FOR CARRYING OUT THE INVENTION

Embodiments of the invention are explained below in detail by reference to the drawings.

FIG. 1 is a view that diagrammatically shows the configuration of a waste liquid treatment system including a waste liquid treatment device according to one aspect of the invention. The waste liquid treatment system 100 is a system for treating a waste liquid that has generated in an electronic component production factory or the like and that mainly contains sulfuric acid ($H_2SO_4$) and hydrogen peroxide ($H_2O_2$). The waste liquid treatment system 100 includes a first reservoir tank 10 for temporarily retaining water to be treated (waste liquid) sent from another system of the factory, a waste liquid treatment device 20 for treating the water to be treated that is sent from the first reservoir tank 10, and a second reservoir tank 30 for temporarily retaining treated water obtained by the treatment with the waste liquid treatment device 20.

The first reservoir tank 10 serves to temporarily retain the water to be treated and send the water to the waste liquid treatment device 20 with a delivery pump not shown in the figure, and the configuration thereof is not particularly limited. The waste liquid treatment device 20 receives the water to be treated that is sent from the first reservoir tank 10, and decomposes the hydrogen peroxide contained in the water to be treated, mainly by the action of a catalyst, thereby giving treated water. The waste liquid treatment device 20 sends out the treated water that mainly contains sulfuric acid, to the second reservoir tank 30. The second reservoir tank 30 temporarily retains the treated water and then sends out the treated water to an outside system. The configuration of the second reservoir tank 30 also is not particularly limited.

Next, one embodiment of the waste liquid treatment device 20 is explained using FIG. 2. The waste liquid treatment device 20 has a box-shaped appearance, and includes a housing 21, an introduction port 22 for water to be treated, a discharge port 23 for treated water, and a plurality of channel-defining members 24 that define a channel for the water to be treated.

The housing 21 has the shape of a rectangular parallelepiped constituted of a given resin or the like. However, the housing 21 is not particularly limited in the shape, material, etc. thereof. The introduction port 22 is formed in one of the side walls of the housing 21, and serves to introduce the water to be treated that is sent form the first reservoir tank 10. There are no particular limitations on the shape of the introduction port 22, where the introduction port 22 is to be disposed, etc.

Inside the housing 21, a plurality of channel-defining members 24 that define a channel for the water to be treated are disposed. In this embodiment, partition walls 25 are disposed outside the region where the channel-defining members 24 are disposed, so as to extend upward from the bottom 21a of the housing 21. The partition walls 25 serve to render the height of the water to be treated, that is, the position (level) of the liquid surface L, constant. Since the water to be treated is treated within the region between the partition walls 25, the height H of the partition walls 25 is substantially equal to the position (level) of the liquid surface L under which the water to be treated comes into contact with the channel-defining members 24.

Of the plurality of channel-defining members 24, some channel-defining members (first channel-defining members) 24a are disposed on the bottom 21a of the housing 21 so as to extend upward from the bottom 21a. The other channel-defining members (second channel-defining members) 24b are disposed with a member not shown in the figure (for example, beams disposed so as to extend along two lateral sides of the housing 21) so as to extend from an upper position within the housing 21 downward toward the bottom 21a, and do not reach the bottom 21a, and are disposed apart from the bottom 21a so that slits S1 that the water to be treated can pass through are formed between the ends of the channel-defining members 24b and the bottom 21a. Meanwhile, slits S2 are formed between the ends of the channel-defining members 24a and the liquid surface L of the water to be treated. The channel-defining members 24a and the channel-defining members 24b are alternately arranged between the introduction port 22 and the discharge port 23 for treated water.

In this embodiment, each channel-defining member 24 is configured so as to have the shape of a plate constituted of a base made of a given metal. Although the material of the base is not particularly limited, it is preferred to use a material having resistance to sulfuric acid, such as Zr, Nb, or Ta. In the case of using Ti, it is desirable to coat another metal therewith.

The surface of the base of each channel-defining member 24 is coated with a catalyst for decomposing hydrogen peroxide. The kind of the catalyst is not particularly limited. For example, a Pt alloy is used and is applied to the base by plating. Consequently, the spacing W1 between the channel-defining members 24 shown in FIG. 2 is equal to the catalyst-to-catalyst spacing. The width of the slits S1 between the ends of the channel-defining members (second channel-defining members) 24b and the bottom 21a is defined as a channel width W2.

In this embodiment, the water to be treated that flows into the housing 21 through the introduction port 22 overflows the partition wall 25a disposed adjacently to the introduction port 22, along the flow indicated by the arrow A, and then flows along the channel P indicated by the broken-line. The channel P is defined zigzag so that the channel P turns back at the slits S1 and S2, i.e., at two vertically different heights H1 and H2 within the housing 21. Thus, a given amount of contact area is ensured as the area of contact between the water to be treated and the catalyst of the channel-defining members 24 in the channel P.

The hydrogen peroxide in the water to be treated that comes into contact with the catalyst of the channel-defining members 24 is decomposed into water and oxygen in accordance with the reaction formula $2H_2O_2 \rightarrow 2H_2O + O_2$. The oxygen ($O_2$) yielded is discharged through the ceiling of the housing 21. Although the ceiling board of the housing 21 is omitted in FIG. 2, a ceiling board may be disposed as shown in FIG. 1.

The treated water obtained in the process described above by treating the water to be treated overflows the partition wall 25b disposed adjacently to the discharge port 23, along the flow indicated by the arrow B, and is then discharged through the discharge port 23 from the housing 21 and sent to the second reservoir tank 30.

FIG. 3 shows another embodiment of the waste liquid treatment device 20. In this embodiment, all the channel-defining members 24 are disposed on the bottom 21a of the housing 21. The channel-defining members 24 each have, formed therein, one or more holes or the like that water to be treated can pass through. The water to be treated that has overflown the partition wall 25a passes through the holes to undergo turbulent flows in lateral directions (horizontal directions), and flows to the partition wall 25b along the arrow C while being stirred. Namely, in this embodiment, since the water to be treated that is passing through the holes of the channel-defining members 24 undergoes turbulent flows, a channel that has a turning in a pseudo manner in at least one position in the vertical direction within the housing 21 is defined. The arrow C includes not only the flow from the introduction port 22 for water to be treated toward the discharge port 23 but also the flows that turn in a pseudo manner (turns caused by the water itself to be treated) due to the action of such turbulent flows.

FIG. 4A and FIG. 4B shows examples of channel-defining members 24 usable in the waste liquid treatment device 20 of FIG. 3. FIG. 4A shows an example of a channel-defining member 24 constituted of a punching metal; this channel-defining member 24 has a plurality of holes 24A formed therein, and water to be treated can pass through the holes 24A. FIG. 4B shows an example of a channel-defining member 24 constituted of an expanded metal; this channel-defining member 24 has a large number of meshes 24B formed therein, and water to be treated can pass through the meshes 24B.

FIG. 5A and FIG. 5B shows still another embodiment of the waste liquid treatment device 20. FIG. 5A is a side view that illustrates the internal configuration of the waste liquid treatment device 20, and FIG. 5B is a plan view that illustrates the internal configuration of the waste liquid treatment device 20. In this embodiment, all the channel-defining members 24 are disposed on the bottom 21a of the housing 21. Furthermore, some channel-defining members (first channel-defining members) 24c are attached also to one lateral side (first lateral side) 21b of the housing 21, and the other channel-defining members (second channel-defining members) 24d have been attached also to another lateral side (second lateral side) 21c that faces said one lateral side 21b. Slits S3 that the water to be treated can pass through are formed between the ends of the channel-defining members 24c and said other lateral side 21c, and slits S4 that the water to be treated can pass through are formed between the ends of the channel-defining members 24d and said one lateral side 21b. The channel-defining members 24c and the channel-defining members 24d are alternately arranged between the introduction port 22 and the discharge port 23 for treated water.

In this embodiment also, the spacing W1 between the channel-defining members 24 is equal to the catalyst-to-catalyst spacing as in the embodiment shown in FIG. 2. Furthermore, the width of the slits S3 and that of the slits S4 are defined as channel widths W2.

In this embodiment, the water to be treated that has flowed into the housing 21 through the introduction port 22 overflows the partition wall 25a disposed adjacently to the introduction port 22, along the flow indicated by the arrow A in FIG. 5A, and then flows along the channel P indicated by the broken-line arrow in FIG. 5B. The channel P is defined zigzag so that the channel P has a turning at the slits S3 and S4, i.e., in two horizontally different positions P1 and P2 within the housing 21. Thus, a given amount of contact area is ensured as the area of contact between the water to be treated and the catalyst of the channel-defining members 24 in the channel P. The treated water obtained by treating the water to be treated overflows the partition wall 25b disposed adjacently to the discharge port 23, along the flow indicated by the arrow B in FIG. 5A, and is then discharged through the discharge port 23 from the housing 21 and sent to the second reservoir tank 30.

As described above, in the waste liquid treatment device of the invention, one or more channel-defining members having a surface that a catalyst capable of decomposing hydrogen peroxide is disposed on are disposed in the housing. The channel-defining members define a channel having a turning in at least one position in any of various modes, and water to be treated flows along this channel. Since the channel having a turning, a given amount of channel length within the housing is ensured, and a given amount of the area of contact between the water to be treated and the catalyst is ensured. In each of the examples shown in FIG. 2, FIG. 5A and FIG. 5B, a channel having a turning in at least one position is defined by the physically turning space between two channel-defining members. In the example shown in FIG. 3, a channel having a turning in at least one position is defined by the flows that turn in a pseudo manner due to the action of turbulent flows of the water itself to be treated that is passing through the holes of the channel-defining members.

Next, the results of experiments in which water to be treated (waste liquid) was treated using the waste liquid treatment devices 20 described above are explained. The water to be treated had a sulfuric acid concentration of 73% by mass and a hydrogen peroxide concentration of 1.8% by mass (18,000 mg/L).

First, the concentration of residual hydrogen peroxide (mg/L) in the water to be treated was examined with respect to the waste liquid treatment device 20 shown in FIG. 2 in which the area of the catalyst that came into contact with the water to be treated was varied so as to be 0 (untreated state), 500 cm$^2$, 1,000 cm$^2$, 1,500 cm$^2$, 2,000 cm$^2$, and 2,500 cm$^2$. Here, the residual concentration of hydrogen peroxide in the water to be treated was examined under two kinds of flow rate conditions: a face velocity of 0.64 mL/cm$^2$·min and a flow rate of 32 mL/min (first flow rate conditions); and a face velocity of 0.32 mL/cm$^2$·min and a flow rate of 16 mL/min (second flow rate conditions). The catalyst-to-catalyst spacing, i.e., the spacing W1 of the channel-defining members 24, was set at 5 mm, and the channel width W2 was set at 10 mm. The results are shown below.

TABLE 1

|  | Catalyst area (cm$^2$) | | | | | |
| --- | --- | --- | --- | --- | --- | --- |
|  | 0 | 500 | 1,000 | 1,500 | 2,000 | 2,500 |
| Residual concentration under the first flow rate conditions (mg/L) | 18,000 | 6,800 | 3,200 | 1,700 | 1,000 | 700 |
| Residual concentration under the second flow rate conditions (mg/L) | 18,000 | 3,200 | 1,000 | 700 | 400 | 300 |

Next, with respect to the waste liquid treatment device 20 shown in FIG. 5A and FIG. 5B, an experiment was conducted under the same conditions as described above to examine the concentrations of residual hydrogen peroxide in the water to be treated. The results are shown below.

TABLE 2

|  | Catalyst area (cm$^2$) | | | | | |
| --- | --- | --- | --- | --- | --- | --- |
|  | 0 | 500 | 1,000 | 1,500 | 2,000 | 2,500 |
| Residual concentration under the first flow rate conditions (mg/L) | 18,000 | 7,100 | 3,600 | 2,200 | 1,100 | 800 |
| Residual concentration under the second flow rate conditions (mg/L) | 18,000 | 3,200 | 1,300 | 600 | 300 | 250 |

As can be seen from the results of the experiments, the waste liquid treatment devices of the invention each can lower the hydrogen peroxide concentration of the water to be treated, that initially has an exceedingly high hydrogen peroxide concentration of 18,000 mg/L, to a level of several hundreds of milligrams per liter by passing the water to be treated through the device only once.

In the waste liquid treatment device and waste liquid treatment method of the invention, one or more channel-defining members having a surface that a catalyst is disposed on are disposed in a housing and the channel-defining members define, between the introduction port and the discharge port, a channel having a turning in at least one position. Due to this simple structure, a given amount of the area of contact between the water to be treated and the catalyst is ensured and the water to be treated can be efficiently treated (the hydrogen peroxide can be decomposed). Since the device not only has the simple structure but also employs a channel having a turning within the housing, the device can be reduced in size and can be extremely easily handled. For example, access to the inside of the housing from above the housing is possible and the catalyst and decomposition gas can be thus inspected, thereby rendering the maintenance easy.

Furthermore, according to the waste liquid treatment device of the invention, since the water to be treated can be treated without adding an unnecessary chemical, the treated water is easy to effectively utilize as high-concentration sulfuric acid. There also is no need of externally applying energy for heating, etc., and the treatment can hence be performed at low cost. The water to be treated that has ordinary temperature can be treated as such, and the treatment can be carried out in a short time period.

Moreover, the catalyst can be easily replaced, for example, by replacing the channel-defining members or adding or removing channel-defining members. The waste liquid treatment device can hence flexibly accommodate changes in the concentration of the water to be treated or in the criterion of the concentration of residual hydrogen peroxide after the treatment.

In addition, by using a catalyst having a high function and high corrosion resistance, the device can be rendered usable semipermanently and a continuous treatment can be easily rendered possible as compared with the case of using materials that are prone to deteriorate, such as activated carbon.

In the embodiments described above, platy channel-defining members 24 were used as the channel-defining members for defining a channel for the water to be treated. However, the channel-defining members for defining a channel are not particularly limited in the shape thereof, etc. Furthermore, although the base that constitutes each channel-defining member has a surface coated with a catalyst, there are no particular limitations on the kind of the catalyst, methods for disposing the catalyst on the base, etc., so long as a catalyst capable of decomposing hydrogen peroxide is disposed in the surface of each channel-defining member.

In each of the waste liquid treatment devices 20 shown in FIG. 2 to FIG. 5B, the channel P has been defined so as to have a turning at at least two vertically different heights or in at least two horizontally different positions. However, the number of heights or positions where the channel has a turning is not particularly limited.

The partition walls 25 (25a and 25b) of FIG. 2 differ from the partition walls 25 (25a and 25b) of FIG. 3 and FIG. 5A in height H. By changing the height of the partition walls 25, the level of the liquid surface L of the water to be treated can be changed. In accordance with the constitution required of the device, the height H of the partition walls 25 can be changed at will.

In the embodiments shown above, the water to be treated was a waste liquid containing both sulfuric acid and hydrogen peroxide. However, the waste liquid treatment device and waste liquid treatment method of the invention are applicable also to waste liquids that at least contain hydrogen peroxide and further contain one or more substances other than sulfuric acid.

The present invention should not be construed as being limited to the embodiments described above and can be suitably modified or improved. The material, shape, dimensions, numerical value, form, number, position, etc. of each constituent element in each of the embodiments described above are at will and not limited, so long as the present invention can be achieved.

This application is based on a Japanese patent application filed on Dec. 11, 2014 (Application No. 2014-251316), the contents thereof being incorporated herein by reference.

DESCRIPTION OF THE REFERENCE NUMERALS

10 First reservoir tank
20 Waste liquid treatment device
21 Housing
22 Introduction port
23 Discharge port
24 Channel-defining member
25 Partition wall
30 Second reservoir tank
100 Waste liquid treatment system

The invention claimed is:

1. A waste liquid treatment device for treating water that contains hydrogen peroxide and sulfuric acid, comprising:
a housing,
an introduction port associated with the housing and that introduces the water that contains hydrogen peroxide and sulfuric acid into the housing,
a discharge port associated with the housing for discharging treated water, and
a plurality of channel-defining members that are disposed within the housing and each channel-defining member having a surface coated with a catalyst capable of decomposing hydrogen peroxide,
wherein the plurality of channel-defining members define, between the introduction port and the discharge port, a channel for the water, the channel having a turning in at least one position,
wherein the plurality of channel-defining members comprise:
one or more first channel-defining members attached to both a bottom of the housing and a first lateral side thereof and one or more second channel-defining members attached to both the bottom of the housing and a second lateral side thereof, the second later side facing the first lateral side;
the one or more first channel-defining members and one or more second channel-defining members are alternately arranged between the introduction port and the discharge port to define the channel so that the water flows while turning back at at least two horizontally different positions, and
a distance between each of the catalysts that face with each other across the channel is the same as a distance between the first channel-defining member and the second channel-defining member that face each other across the channel.

2. The waste liquid treatment device according to claim 1, wherein
each channel-defining member is constituted of at least any of one plate, one punching metal, and one expanded metal.

3. A waste liquid treatment method for treating water that contains hydrogen peroxide and sulfuric acid by decomposing the hydrogen peroxide contained in the water and by suing the waste liquid treatment device according to claim 1, comprising:
introducing the water into the introduction port of the housing, and
causing the water to flow through the channel defined by the plurality of channel-defining members and turning in at least one position, thereby treating the water.

4. The waste liquid treatment device according to claim 1, further comprising:
a first partition wall that is disposed upstream of the region where the plurality of channel-defining members are disposed in the housing, the first partition wall extends upward from the bottom of the housing, and
a second partition wall that is disposed downstream of the region where the plurality of channel-defining members are disposed in the housing, the second partition wall extends upward from the bottom of the housing,
wherein the water that has flowed into the housing through the introduction port overflows the first partition wall and then flows into the channel; and
a treated water obtained by treating the water overflows the second partition wall and is then discharged through the discharge port.

5. A waste liquid treatment device for treating water that contains hydrogen peroxide and sulfuric acid, comprising:
a housing,
an introduction port associated with the housing that introduces the water that contains hydrogen peroxide and sulfuric acid into the housing,
a discharge port associated with the housing for discharging treated water, and
a plurality of channel-defining members that are disposed within the housing and each channel-defining member having a surface coated with a catalyst capable of decomposing hydrogen peroxide,
wherein the plurality of channel-defining members define, between the introduction port and the discharge port, a channel for the water, the channel having a turning in at least one position;
wherein the plurality of channel-defining members comprise
one or more first channel-defining members attached to a bottom of the housing and
one or more second channel-defining members disposed apart from the bottom of the housing, and the one or more first channel defining embers and the one or more second channel defining members are alternately arranged between the introduction port and the discharge port so that the water flows while turning back at at least two vertically different heights,
wherein a distance between each of the catalysts that face with each other across the channel is the same as a distance between the first channel-defining member and the second channel defining member that face with each other across the channel.

6. The waste liquid treatment device according to claim 5, wherein each channel-defining member is constituted of at least any of one plate, one punching metal, and one expanded metal.

7. A waste liquid treatment method for treating water that contains hydrogen peroxide and sulfuric acid by decomposing the hydrogen peroxide contained in the water and by using the waste liquid treatment device according to claim 5, comprising:
   introducing the water into the introduction port of the housing, and
   causing the water to flow through the channel defined by the plurality of channel-defining members and turning in at least one position, thereby treating the water.

8. The waste liquid treatment device according to claim 5, further comprising:
   a first partition wall that is disposed upstream of the region where the plurality of channel-defining members are disposed in the housing, the first partition wall extends upward from the bottom of the housing, and
   a second partition wall that is disposed downstream of the region where the plurality of channel-defining members are disposed in the housing, the second partition wall extends upward from the bottom of the housing,
   wherein the water that has flowed into the housing through the introduction port overflows the first partition wall and then flows into the channel; and
   a treated water obtained by treating the water overflows the second partition wall and is then discharged through the discharge port.

\* \* \* \* \*